United States Patent [19]
Kawamura

[11] Patent Number: 5,909,288
[45] Date of Patent: Jun. 1, 1999

[54] IMAGE COMMUNICATION APPARATUS HAVING CONTROLLED START

[75] Inventor: Wataru Kawamura, Komae, Japan

[73] Assignee: Canon Kabushiki Kaisha, Tokyo, Japan

[21] Appl. No.: 08/486,251

[22] Filed: Jun. 7, 1995

Related U.S. Application Data

[63] Continuation of application No. 08/230,413, Apr. 19, 1994, abandoned, which is a continuation of application No. 08/022,603, Feb. 17, 1993, abandoned, which is a continuation of application No. 07/814,695, Dec. 30, 1991, abandoned.

[30] Foreign Application Priority Data

Jan. 17, 1991 [JP] Japan .................................. 3-003866

[51] Int. Cl.⁶ ...................................................... H04N 1/32
[52] U.S. Cl. ........................... 358/468; 358/434; 358/437; 379/100.01
[58] Field of Search ..................................... 358/468, 405, 358/434, 435, 436, 437, 438, 439; 379/100, 100.01

[56] References Cited

U.S. PATENT DOCUMENTS

| | | | |
|---|---|---|---|
| 4,727,576 | 2/1988 | Yoshida | 358/468 |
| 4,800,439 | 1/1989 | Yoshino | 358/438 |
| 4,829,559 | 5/1989 | Izawa et al. | 358/468 |
| 4,856,052 | 8/1989 | Hirata | 379/100 |
| 4,908,851 | 3/1990 | Kotani et al. | 379/100 |
| 4,932,048 | 6/1990 | Kenmochi et al. | 379/67 |
| 5,014,296 | 5/1991 | Saigano | 379/100 |
| 5,022,072 | 6/1991 | Sakakibara et al. | 379/100 |
| 5,086,455 | 2/1992 | Satomi et al. | 379/100 |

FOREIGN PATENT DOCUMENTS 0263966 10/1988 Japan ..................................... 379/100

*Primary Examiner*—Thomas D. Lee
*Attorney, Agent, or Firm*—Fitzpatrick, Cella, Harper & Scinto

[57] ABSTRACT

An image communicating apparatus comprises: a discriminating circuit to discriminate a predetermined procedure signal; a detecting circuit to detect a predetermined operation of a telephone; and an instructing circuit to instruct the execution of an image communication in accordance with either later one of the discrimination of the predetermined procedure signal by the discriminating circuit and the detection of the predetermined operation by the detecting circuit. When a predetermined frequency signal is received a predetermined number of times, the predetermined procedure signal is discriminated.

18 Claims, 3 Drawing Sheets

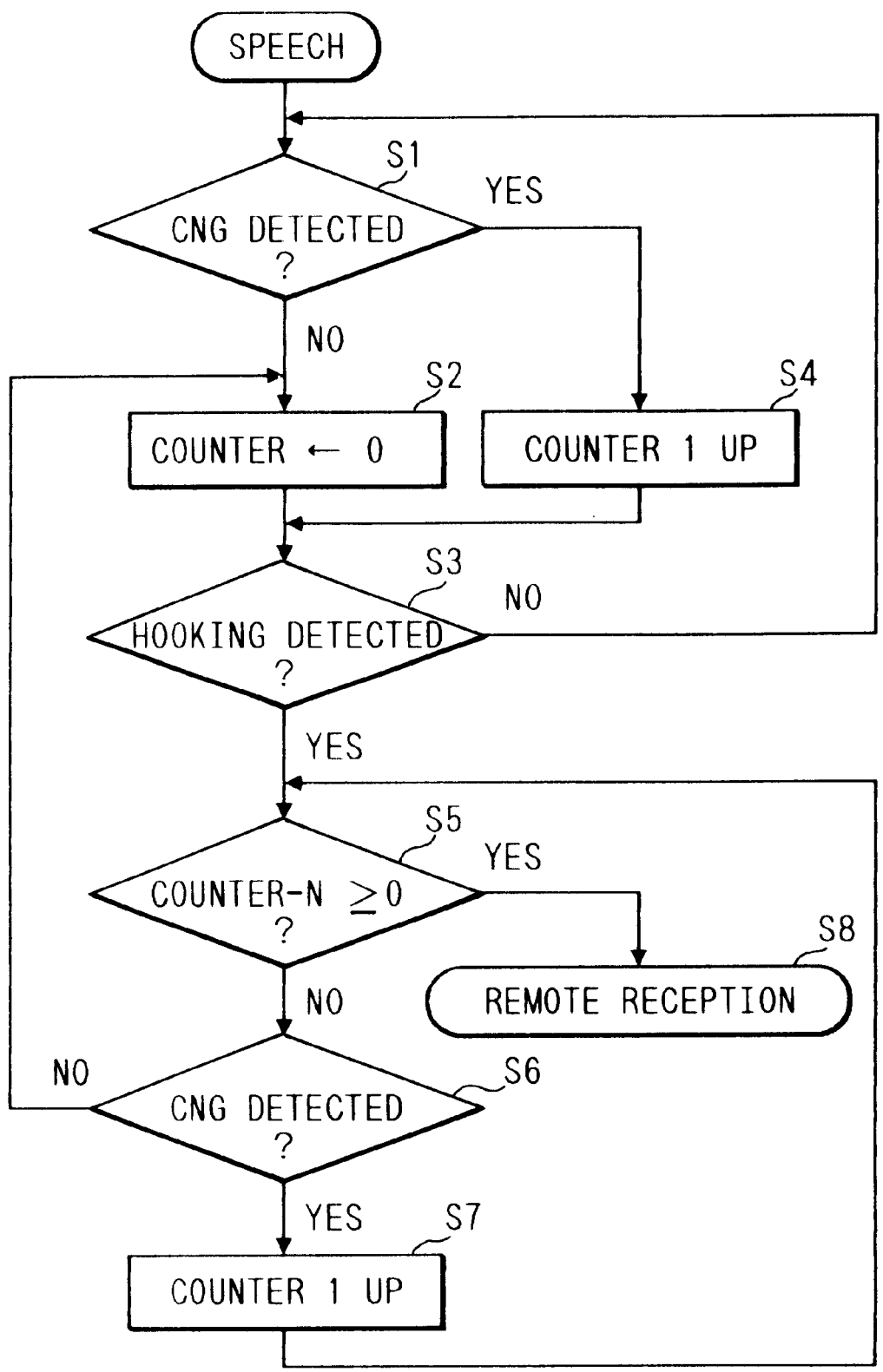

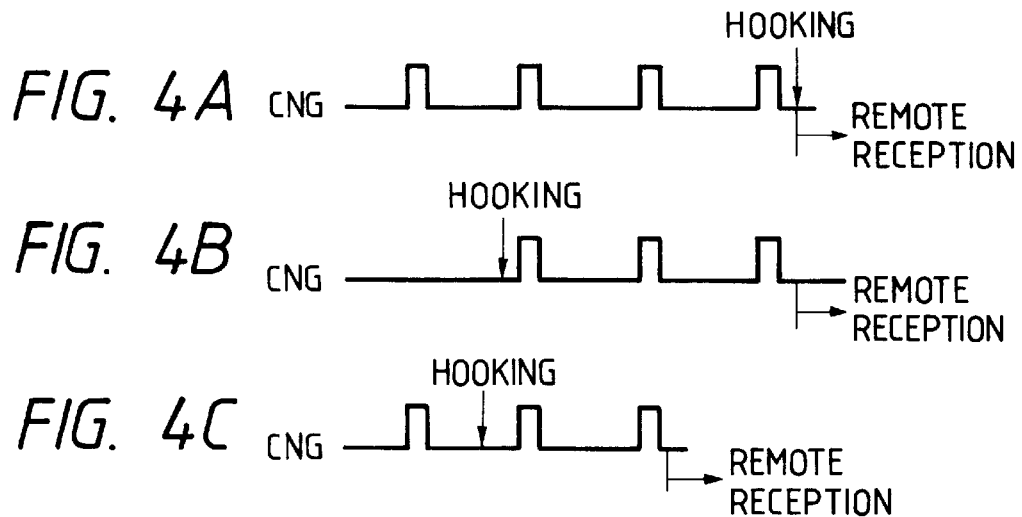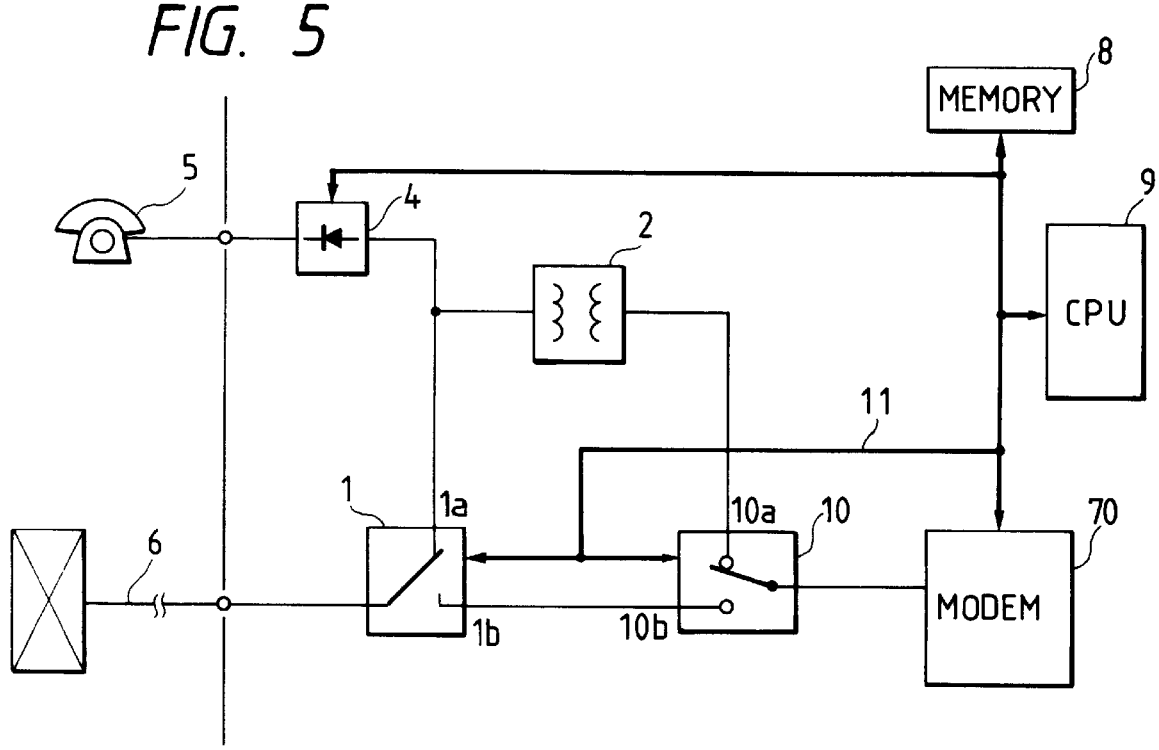

IMAGE COMMUNICATION APPARATUS HAVING CONTROLLED START

This application is a continuation of application Ser. No. 08/230,413 filed Apr. 19, 1994, now abandoned, which is a continuation of application Ser. No. 08/022,603 filed Feb. 17, 1993, abandoned, which is a continuation of application Ser. No. 07/814,695, filed Dec. 30, 1991, abandoned.

BACKGROUND OF THE INVENTION

1. Field of the Invention

The invention relates to an image communicating apparatus for performing an image communication after a predetermined procedure signal was communicated.

2. Description of the Related Background Art

Hitherto, in the case where a call is received to a facsimile apparatus to which a telephone can be connected from the outside and the user responds by such an external telephone, a CNG (originating call tone) is heard from a receiver so long as the call was generated from a facsimile apparatus on the partner side. In such a case, when a person responding hooks the external telephone or sends a code by a predetermined DTMF signal, the facsimile apparatus detects it and connects the line to the facsimile side and executes a facsimile reception Due to this, the person responding can operate (remote reception) from a remote position without moving to the location of the facsimile apparatus However, in the case of using the hooking, there is a drawback such that when a catch phone is received, the line is switched to the facsimile apparatus and the catch phone service cannot be received. In catch telephone service, a telephone connected to an exchange that is busy on a first call connection receives a tone signal when the exchange receives another call for the telephone. The called person may then hook the telephone to connect the new call to the telephone while holding the first call connection. Although there is also a private branch exchange which provides various services using the hooking such as holding, extension/external line switching, and the like, there is also a similar drawback such that those services cannot be used.

In the conventional example in which a code is sent by a DTMF signal, a telephone which can send the DTMF must be used. There is also a drawback such that if the code coincides with a code of a computer service or the like, the service cannot be received. There is also an example in which the service is limited such that a remote reception is performed only when the telephone is called. In such an example, there is a drawback such that an originating call is executed and the facsimile reception after the speech cannot be executed.

SUMMARY OF THE INVENTION

It is an object of the invention to improve the manual reception by an external telephone.

Another object of the invention is to enable a service of an external apparatus such as private branch exchange, computer, or the like and a service of a manual communication to be received by an external telephone.

Still another object of the invention is to provide an image communicating apparatus which executes a communication of an image signal when the offhook of an external telephone and a predetermined procedure signal are detected.

Further another object of the invention is to prevent a malfunction of the image communication.

The above and other objects and features of the present invention will become apparent from the following detailed description and the appended claims with reference to the accompanying drawings.

BRIEF DESCRIPTION OF THE DRAWINGS

FIG. 2 is a flowchart showing the operation of the embodiment of the invention;

FIGS. 4A to 4C are sequence diagrams of the remote reception according to the embodiment of the invention; and FIG. 5 is a partial block diagram showing a construction of another embodiment.

DETAILED DESCRIPTION OF THE PREFERRED EMBODIMENTS

Figure 1:
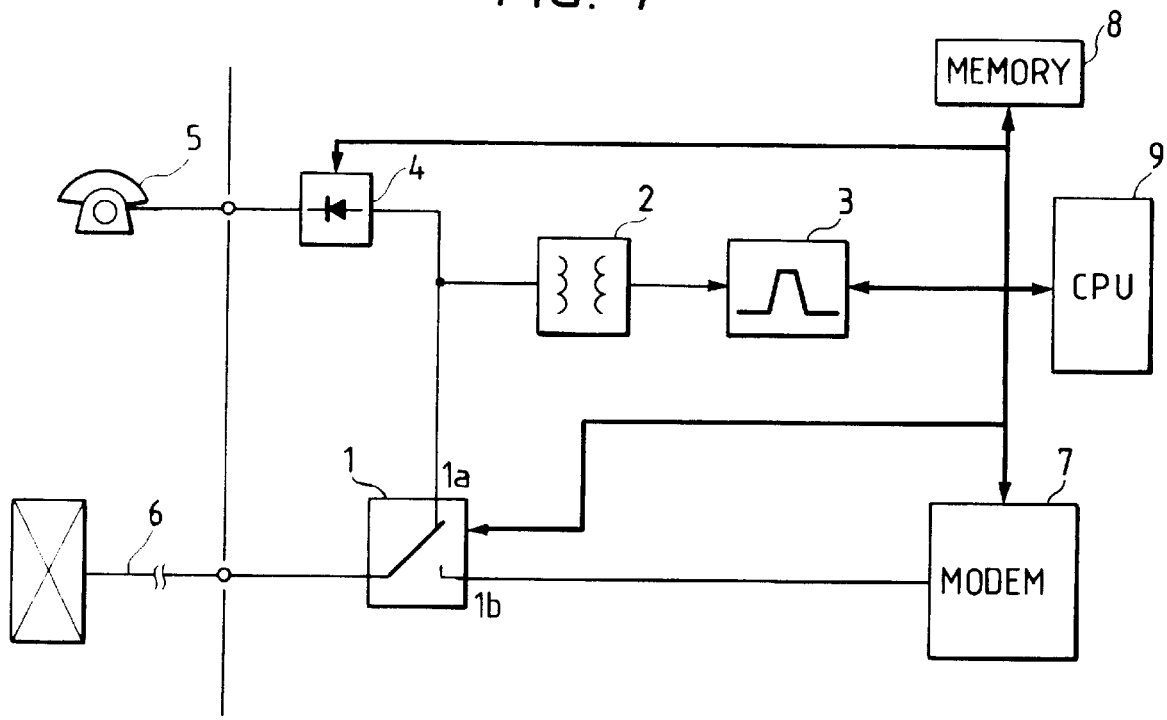
FIG. 1 is a block diagram of a main portion showing a construction of a facsimile apparatus in which the invention is embodied.

FIG. 1 is a block diagram showing a construction of a hardware of an embodiment of the invention. In the diagram reference numeral 1 denotes a CML relay to switch a telephone line to either the side of a telephone 5 or the side of a modem 7. Reference numeral 2 denotes a transformer to monitor a line signal when the external telephone 5 is connected to a telephone line 6; 3 a tone detecting circuit to detect a CNG (originating call tone) of 1100 Hz from the signal monitored by the transformer 2; 4 a DC detecting circuit to detect a line current; 5 the external telephone which is connected to the facsimile apparatus; 6 the telephone line; 7 the modem to execute the facsimile transmission and reception; 8 an RAM (memory); and 9 a CPU (central processing unit) to control the apparatus.

First, in the standby mode of the apparatus, the CML relay 1 is connected to a terminal 1a side and the line 6 is connected to the telephone 5. Therefore, when a call is generated from the line 6, a bell of the telephone 5 rings. By offhooking the telephone 5, a speech mode is set. When there is no call from the line 6, by offhooking the telephone 5 and by dialing, a selection signal is sent to the line 6. When the partner responds, the speech mode is set. In the speech mode, a DC current flows in the DC detecting circuit 4. When the telephone 5 is hooked, the DC current doesn't flow for only a period of time of the hooking (ordinarily, 0.5 to 0.9 second). The CPU 9 can detect the hooking by monitoring the DC detecting circuit 4. On the other hand, since the CPU 9 can monitor the signal in speech through the transformer 2, when the CNG signal is sent from the line 6, 1100 Hz is detected by the tone detecting circuit 3 and it is possible to discriminate whether the signal is the CNG signal or not. An algorithm of the CNG detection will be explained hereinlater.

When it is determined that the signal is the CNG signal, the CPU 9 reads the number of detection times in the RAM 8 and increases it by +1 and writes the new number into the RAM 8. When the CPU 9 connects the CML relay 1 to a terminal 1b side, the line 6 is connected to the modem 7, so that the facsimile communication can be performed.

Figure 3:
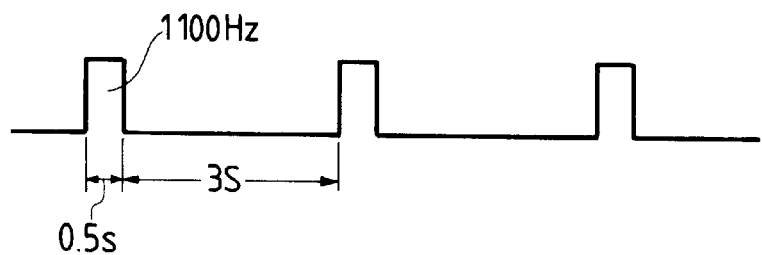
FIG. 3 is a pattern diagram of an CNG signal.

The algorithm for CNG detection will now be described FIG. 3 shows a recommended pattern of the CNG signal. The invention is not limited to such an algorithm but can also use another algorithm.

First, when the tone detecting circuit 3 detects the signal of 1100 Hz for a period of time from 0.2 to 0.5 second, the CPU 9 increases a count value of a counter by +1. After that, when the signal of 1100 Hz is again detected within a time from 3 to 3.5 seconds, the CPU 9 determines that the CNG signal has been detected, so that the CPU 9 further increases the count value by +1 and repeats the above processes. When the next 1100 Hz cannot be detected within a time from 3 to 3.5 seconds, the CPU 9 decides that the signal is a noise, so that the counter is reset to 0. The above algorithm is used in steps S1 and S6 in FIG. 2.

The operation of the embodiment of the invention will now be described with reference to a flowchart shown in FIG. 20

In step S1, the CPU 9 performs the CNG detection by the tone detecting circuit 3 in accordance with the above algorithm When no CNG signal is detected, step S2 follows and 0 is set into the count value in the RAM 8. In the next step S3, the hooking is detected by the DC detecting circuit 4. When the hooking is not detected, the processing routine is returned to step S1.

On the other hand, when the CNG signal is detected in step S1, step S4 follows and the CPU 9 increases the count value of the counter in the RAM 8 by +1 and stores the new count value therein. Then, step S3 follows. When the hooking is detected in step S3, step S5 follows and the CPU 9 subtracts N (positive integer) from the count value in the RAM 8. When the resultant count value is equal to 0 or positive, step S8 follows and the remote reception is executed.

When the count value is negative in step S5, the CPU 9 advances to step S6. When the CNG signal is detected within a time from 3.0 to 3.5 seconds, step S7 follows and the count value of the counter in the RAM 8 is increased by +1 and the processing routine is returned to step S5. The above processes are repeated. On the other hand, when the CNG signal cannot be detected in step S6, the processing routine is returned to step S2 and the CPU 9 again resets the count value in the RAM 8 to 0, thereby inhibiting the remote reception with respect to the above hooking detection.

FIGS. 4A to 4C show sequences of the remote reception in the case where the value of N is set to 3 in accordance with the above algorithm. FIG. 4A shows the case where the hooking is executed after the CNG signal occurs three or more times. FIG. 4B shows the case where the CNG is detected after the hooking was performed. FIG. 4C shows the case where the hooking is executed after the CNG occurs once. As mentioned above, according to the embodiment, the remote reception is executed on the basis of the AND of the result in which the CNG was detected a specified number of times or more and the result in which the hooking was detected. Since no remote reception is performed in the cases of the patterns other than the above pattern, so long as the partner is not a facsimile apparatus, even if the hooking is executed, the telephone 5 and the line 6 are held in the connected state. Thus, the services by the hooking of the exchange can be received.

The value of N can be also set to 1.

Even in the case of the manual transmission, the remote reception can be realized by the above construction to the facsimile apparatus which sends the CNG.

As described above, when the hooking of the external telephone 5 is detected by the DC detecting circuit 4, the CPU 9 of the embodiment switches the CML relay 1 to thereby allow the facsimile communication by the modem 7 to be executed so long as the CNG signal has already been detected by the tone detecting circuit 3. On the other hand, when the hooking of the external telephone 5 has been detected, if the CNG signal is not detected yet, the CPU 9 continues the speech by the external telephone 5 without switching the CML relay 1.

Further, according to the embodiment, when the hooking is performed for a period of time when the CPU 9 discriminates whether the signal on the line is the CNG signal or not, after the CNG signal was confirmed, the CPU 9 switches the CML relay 1 to thereby allow the facsimile communication by the modem 7 to be performed.

FIG. 5 shows a block diagram of a main section of another embodiment of the invention.

In the embodiment, a modem 70 having a tone detecting function and a relay 10 to connect the output side of the transformer 2 and the terminal 1b thereof to the modem 70 are added in place of the tone detecting circuit 3 of 1100 Hz. Reference numeral 11 denotes a signal line from the CPU 9 to control the relays 1 and 10. When the CML relay 1 is connected to the terminal 1a, the relay 10 is connected to a terminal 10a side. When the CML relay 1 is connected to the terminal 1b, the relay 10 is connected to a terminal 10b side. With the above construction, the costs can be reduced. In such a case, when the CML relay 1 is connected to the terminal 1a, it is sufficient that the modem 70 detects the tone. Therefore, it is sufficient to use only one control signal of the relay.

Although the present invention has been described with respect to the preferred embodiments, the invention is not limited to the foregoing embodiments but many modifications and variations are possible within the spirit and scope of the appended claims of the invention.

What is claimed is:

1. An image communicating apparatus comprising:
    discriminating means for discriminating a predetermined procedure signal for image communication;
    detecting means for detecting a hooking operation which causes a DC-current not to flow during a short period of time; and
    instructing means for instructing execution of an image communication in accordance with both of the discrimination of the predetermined procedure signal for image communication by said discriminating means and the detection of the hooking operation by said detecting means.

2. An apparatus according to claim 1, wherein said discriminating means discriminates the predetermined procedure signal when a predetermined frequency signal is received a predetermined number of times.

3. An apparatus according to claim 1, wherein said instructing means instructs the execution of the image communication in accordance with one-time detection of the hooking operation.

4. An image communication starting method comprising the steps of:
    waiting for discrimination of a predetermined procedure signal for image communication and detection of a hooking operation which causes a DC-current not to flow during a short period of time; and
    instructing start of an image communication upon both of the discrimination of the predetermined procedure signal for image communication and the detection of the hooking operation.

5. A method according to claim 4, wherein, in said instructing step, the start of the image communication is instructed upon one-time detection of the hooking operation.

6. A method according to claim 4, wherein, in said waiting step, when a predetermined frequency signal is received a predetermined number of times, the predetermined procedure signal is discriminated.

7. A data communicating apparatus comprising:

connecting means for connecting a telephone and a data communication unit selectively to a line;

discriminating means for discriminating a predetermined procedure signal for image communication on the line;

detecting means for detecting a hooking operation which causes a DC-current not to flow in the line during a short period of time; and control means for controlling said connecting means so as to connect the data communication unit to the line in accordance with both of the discrimination of the predetermined procedure signal for image communication by said discriminating means and the detection of the hooking operation by said detecting means, in a state where said connecting means connects the telephone to the line.

8. An apparatus according to claim 7, wherein said discriminating means discriminates the predetermined procedure signal when a predetermined frequency signal is received a predetermined number of times.

9. An apparatus according to claim 7, wherein said control means controls said connecting means such that the data communication unit is connected to the line in accordance with one-time detection of the hooking operation.

10. An image communicating apparatus comprising:

first detecting means for detecting a predetermined procedure signal for image communication;

second detecting means for detecting a hooking operation for instructing an execution of an image communication; and instructing means for instructing the execution of image communication, when both the predetermined procedure signal for image communication and the hooking operation are detected by said first detecting means and said second detecting means.

11. An apparatus according to claim 10, wherein said first detecting means detects the predetermined procedure signal for image communication when a predetermined frequency signal is received a predetermined number of times.

12. An apparatus according to claim 10, wherein said instructing means instructs the execution of image communication in accordance with a one-time detection of the hooking operation by said second detecting means.

13. An image communicating starting method comprising the steps of:

waiting for both a detection of a predetermined procedure signal for image communication and a detection of a hooking operation for instructing an execution of image communication; and instructing a start of image communication, when both the predetermined procedure signal and the hooking operation are detected.

14. A method according to claim 13, wherein, in said instructing step, the start of image communication is instructed upon a one-time detection of the hooking operation.

15. A method according to claim 13, wherein, in said instructing step, when a predetermined frequency signal is received a predetermined number of times, the predetermined procedure signal is detected.

16. A data communicating apparatus comprising:

connecting means for connecting a telephone and a data communication unit selectively to a line;

first detecting means for detecting a predetermined procedure signal for data communication on the line;

second detecting means for detecting a hooking operation for instructing an execution of data communication; and control means for controlling said connecting means such that the line is connected to the data communication unit, when both the predetermined procedure signal and the hooking operation are detected by the first detecting means and the second detecting means.

17. An apparatus according to claim 16, wherein said first detecting means detects the predetermined procedure signal when a predetermined frequency signal is received a predetermined number of times.

18. An apparatus according to claim 16, wherein said control means controls said connecting means such that the data communication unit is connected to the line in accordance with a one-time detection of the hooking operation by said second detecting means.

* * * * *